(12) United States Patent
Sugimori et al.

(10) Patent No.: US 12,142,789 B2
(45) Date of Patent: *Nov. 12, 2024

(54) NON-AQUEOUS ELECTROLYTE SECONDARY BATTERY

(71) Applicant: Panasonic Intellectual Property Management Co., Ltd., Osaka (JP)

(72) Inventors: Masanori Sugimori, Osaka (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 17/430,355

(22) PCT Filed: Jan. 27, 2020

(86) PCT No.: PCT/JP2020/002826
§ 371 (c)(1),
(2) Date: Aug. 12, 2021

(87) PCT Pub. No.: WO2020/174973
PCT Pub. Date: Sep. 3, 2020

(65) Prior Publication Data
US 2022/0131232 A1  Apr. 28, 2022

(30) Foreign Application Priority Data
Feb. 28, 2019 (JP) .................. 2019-035522

(51) Int. Cl.
*H01M 50/446* (2021.01)
*H01M 50/409* (2021.01)
(Continued)

(52) U.S. Cl.
CPC ....... *H01M 50/446* (2021.01); *H01M 50/409* (2021.01); *H01M 50/426* (2021.01);
(Continued)

(58) Field of Classification Search
None
See application file for complete search history.

(56) References Cited

U.S. PATENT DOCUMENTS 10,002,719 B2 * 6/2018 Ha ..................... H01M 50/451
10,833,355 B2 * 11/2020 Yi ..................... H01M 10/0525
(Continued)

FOREIGN PATENT DOCUMENTS

| CN | 107737702 A | 2/2018 |
|----|-------------|--------|
| CN | 108963161 A | 12/2018 |

(Continued)

OTHER PUBLICATIONS

International Search Report dated Mar. 10, 2020, issued in counterpart application No. PCT/JP2020/002826 (2 pages).

*Primary Examiner* — Kevin M Bernatz
(74) *Attorney, Agent, or Firm* — WHDA, LLP

(57) ABSTRACT

A separator for use in a non-aqueous electrolyte secondary battery according to the present invention comprises a porous substrate and a filler layer disposed upon the substrate. The filler layer includes phosphate particles and a reticulated polyvinylidene fluoride resin. The filler layer has a polyvinylidene fluoride resin content of 15 mass % to 40 mass %, inclusive. The D10 particle size ($D_{10}$) of the phosphate particles on a volume basis is 0.02 μm to 0.5 μm, inclusive, and is smaller than the average pore size of the pores in the substrate. The BET specific surface area of the phosphate particles 30 is 5 $m^2$/g to 100 $m^2$/g, inclusive.

6 Claims, 2 Drawing Sheets

(51) Int. Cl.
    *H01M 50/426*     (2021.01)
    *H01M 50/431*     (2021.01)
    *H01M 50/443*     (2021.01)
    *H01M 50/449*     (2021.01)

(52) U.S. Cl.
    CPC ....... *H01M 50/431* (2021.01); *H01M 50/443* (2021.01); *H01M 50/449* (2021.01)

(56) References Cited

U.S. PATENT DOCUMENTS

| | | | |
|---|---|---|---|
| 10,978,721 B2 * | 4/2021 | Mizuno | C08L 23/06 |
| 11,158,905 B2 * | 10/2021 | Cheng | H01M 50/449 |
| 11,695,117 B2 * | 7/2023 | Goto | H01M 50/443 |
| | | | 429/144 |
| 11,791,495 B2 * | 10/2023 | Yun | H01M 50/457 |
| | | | 429/144 |
| 11,811,093 B2 * | 11/2023 | Jeong | H01M 50/417 |
| 11,824,225 B2 * | 11/2023 | Jin | H01M 50/457 |
| 11,901,578 B2 * | 2/2024 | Kang | H01M 50/403 |
| 11,949,097 B2 * | 4/2024 | Baba | H01M 10/0525 |
| 12,002,988 B2 * | 6/2024 | Kai | H01M 50/414 |
| 2011/0281150 A1 | 11/2011 | Yong et al. | |
| 2013/0089771 A1 | 4/2013 | Nishikawa | |
| 2024/0079727 A1 * | 3/2024 | Feng | H01M 50/461 |

FOREIGN PATENT DOCUMENTS

| | | | |
|---|---|---|---|
| CN | 108976938 A | 12/2018 | |
| JP | 2008-508391 A | 3/2008 | |
| KR | 10-2018-0050178 A | 5/2018 | |
| WO | 2012/137376 A1 | 10/2012 | |
| WO | 2019015671 A1 | 1/2019 | |

* cited by examiner

NON-AQUEOUS ELECTROLYTE SECONDARY BATTERY

TECHNICAL FIELD

The present disclosure relates to a non-aqueous electrolyte secondary battery which has an electrode element in which a positive electrode and a negative electrode are alternately layered with a separator therebetween.

BACKGROUND

In non-aqueous electrolyte secondary batteries, from the viewpoint of higher capacity, increasing an electrode plate density for a positive electrode and a negative electrode is desired. In this case, a layered-type electrode element in which the positive electrode and the negative electrode are alternately layered with a separator therebetween is more advantageous in the structure than a rolled-type electrode element in which the positive electrode and the negative electrode are rolled with the separator therebetween.

In the case of the layered-type electrode element, in order to suppress a position deviation of the positive electrode or the negative electrode after assembly, desirably, the separator and the electrodes are adhered to each other.

For example, Patent Literature 1 discloses a technique in which the electrode and the separator are adhered to each other using a separator having a porous base member, and an adhesive porous layer formed over the porous base member and including a polyvinylidene fluoride-based resin.

CITATION LIST

Patent Literature

Patent Literature 1: WO 2012/137376
Patent Literature 2: CN 107737702 A

SUMMARY

The separator has a shutdown function in which the separator is melted by heat and pores of the separator are thus filled. For example, when the non-aqueous electrolyte secondary battery is exposed to an abnormality state such as excessive charging, internal short-circuiting, external short-circuiting, excessive resistive heating due to a large current, or heating from outside, and heat is thus generated, an increase in a temperature of the battery is suppressed by the shutdown function of the separator. However, there still remains a high demand for further improving the shutdown function of the separator, to suppress the increase in the battery temperature when abnormality occurs in the battery. In addition, a separator in which a functional layer is provided over a porous base member tends to have reduced ion permeability, and there also is a problem in that a battery resistance is increased during a normal time of the battery.

An advantage of the present disclosure lies in provision of a non-aqueous electrolyte secondary battery which shows a superior battery resistance during the normal time of the battery, and which can suppress the increase in the battery temperature when abnormality occurs in the battery.

According to one aspect of the present disclosure, there is provided a non-aqueous electrolyte secondary battery including: an electrode element having a positive electrode, a negative electrode, and a separator, and in which the positive electrode and the negative electrode are alternately layered with the separator therebetween; and a non-aqueous electrolyte, wherein the separator includes a porous base member, and a filler layer placed over the base member, the filler layer includes phosphate particles and a polyvinylidene fluoride-based resin of a mesh form, a content of the polyvinylidene fluoride-based resin in the filler layer is greater than or equal to 15 mass % and less than or equal to 40 mass %, a volume-based 10% particle size ($D_{10}$) of the phosphate particles is greater than or equal to 0.02 μm and less than or equal to 0.5 μm, and is smaller than an average pore size of the base member, and a BET specific surface area of the phosphate particles is greater than or equal to 5 $m^2/g$ and less than or equal to 100 $m^2/g$.

According to an aspect of the present disclosure, a non-aqueous electrolyte secondary battery can be provided which shows a superior battery resistance during a normal time of the battery and which can suppress the increase in the battery temperature when abnormality occurs in the battery.

DESCRIPTION OF EMBODIMENTS

Figure 1:
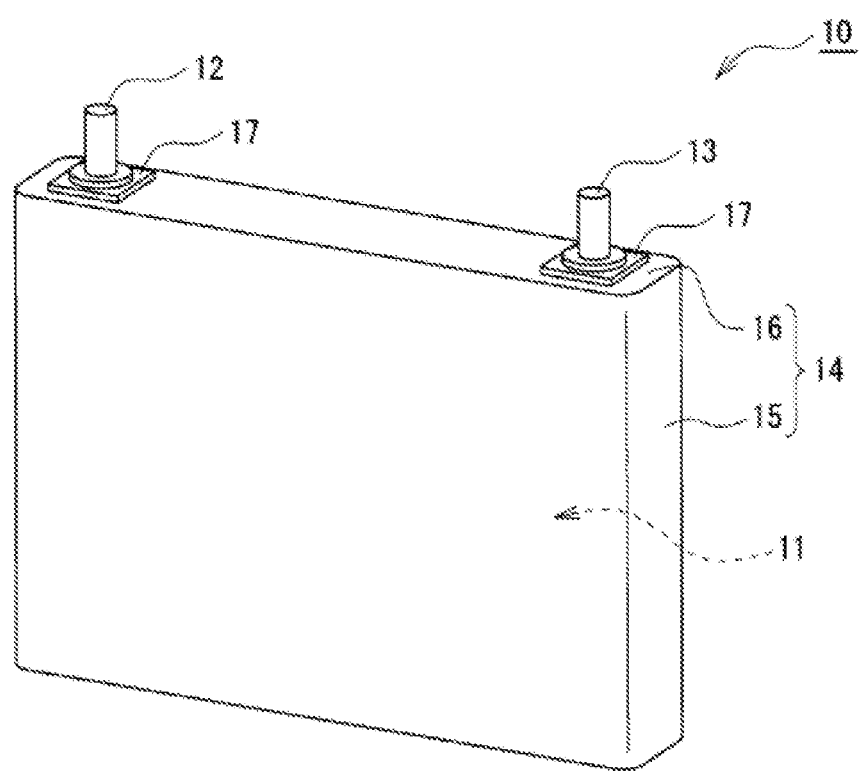
FIG. 1 is a perspective diagram of a non-aqueous electrolyte secondary battery according to an embodiment of the present disclosure.

A non-aqueous electrolyte secondary battery according to an embodiment of the present disclosure comprises: an electrode element having a positive electrode, a negative electrode, and a separator, and in which the positive electrode and the negative electrode are alternately layered with the separator therebetween; and a non-aqueous electrolyte, wherein the separator comprises a porous base member, and a filler layer placed over the base member, the filler layer includes phosphate particles and a polyvinylidene fluoride-based resin of a mesh form, a content of the polyvinylidene fluoride-based resin in the filler layer is greater than or equal to 15 mass % and less than or equal to 40 mass %, a volume-based 10% particle size ($D_{10}$) of the phosphate particles is greater than or equal to 0.02 μm and less than or equal to 0.5 μm, and is smaller than an average pore size of the base member, and a BET specific surface area of the phosphate particles is greater than or equal to 5 $m^2/g$ and less than or equal to 100 $m^2/g$.

In general, a porous base member has a shutdown function in which the porous base member is melted by heat generation when abnormality occurs in the battery, to thereby fill pores of the porous base member. In the present disclosure, this shutdown function of the separator is further improved as the phosphate particles included in the filler layer melt and polymerize with the heat as an accelerating factor during the heat generation by the abnormality of the battery, and the pores of the porous base member are thereby filled. In particular, with the particle size and the BET specific surface area of the phosphate particles in the above-described ranges, the phosphate particles tend to easily melt by the generated heat when the abnormality occurs in the battery, and the pores of the porous base member can be quickly filled. With this configuration, when the abnormality occurs in the battery, for example, movement of lithium ions between the positive and negative electrodes can be quickly blocked by the separator and a heat generation reaction can be suppressed. As a consequence, the increase in the battery temperature can be suppressed. In addition, because the polyvinylidene fluoride-based resin of the mesh form in the filler layer has many pores, the filler layer has a high ion permeability. Therefore, the separator having the filler layer of the present disclosure has a structure in which the movement of the lithium ions is not easily obstructed. Thus, the battery shows a superior battery resistance during the normal time of the battery. Furthermore, because the polyvinylidene fluoride-based resin of the mesh form existing on a surface of the filler layer adheres to the electrode by an anchoring effect, an adhesion strength between the separator and the electrode can be improved. Therefore, there is no need to provide an additional adhesion layer between the separator and the electrode. Such an additional adhesion layer may become a layer obstructing the movement of the lithium ions, which may cause an increase of the battery resistance during the normal time.

Anon-aqueous electrolyte secondary battery according to an embodiment of the present disclosure will now be described in detail.

FIG. 1 is a perspective diagram showing a non-aqueous electrolyte secondary battery according to an embodiment of the present disclosure. A non-aqueous electrolyte secondary battery 10 comprises an electrode element 11, a non-aqueous electrolyte, and a rectangular battery casing 14 which houses the electrode element 11 and the non-aqueous electrolyte. The electrode element 11 comprises a positive electrode, a negative electrode, and a separator. The electrode element 11 is a layered-type electrode element in which a plurality of the positive electrodes and a plurality of the negative electrodes are alternately layered, one by one, with the separator therebetween.

The battery casing 14 comprises a casing body 15 having an approximate box shape, a sealing element 16 which blocks an opening of the casing body 15, a positive electrode terminal 12 electrically connected to the positive electrode, and a negative electrode terminal 13 electrically connected to the negative electrode. The casing body 15 and the sealing element 16 are formed from a metal material, for example, having aluminum as a primary constituent. The positive electrode terminal 12 and the negative electrode terminal 13 are fixed to the sealing element 16 via an insulating member 17. In general, a gas discharging mechanism (not shown) is provided on the sealing element 16. The battery casing is not limited to the rectangular casing, and may alternatively be, for example, a resin casing (laminate) formed with resin films.

Figure 2:
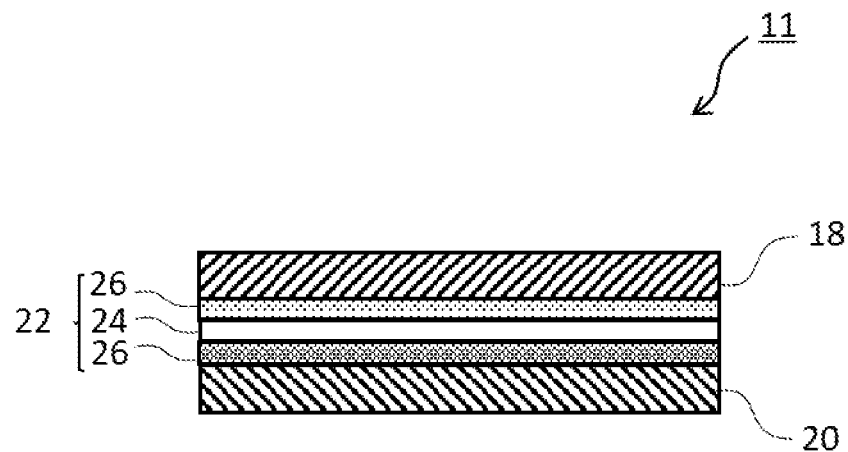
FIG. 2 is a partially enlarged cross-sectional view showing an example of an electrode element used in the non-aqueous electrolyte secondary battery of FIG. 1.

FIG. 2 is a partially enlarged cross-sectional view showing an example of an electrode element used in the non-aqueous electrolyte secondary battery of FIG. 1. The positive electrode, the negative electrode, and the separator will now be described with reference to FIG. 2.

[Positive Electrode]

The positive electrode 18 comprises a positive electrode electricity collector element and a positive electrode mixture layer formed over the electricity collector element. For the positive electrode electricity collector element, there may be employed a foil of a metal which is stable within a potential range of the positive electrode 18 such as aluminum, a film on a surface layer of which the metal is placed, or the like. The positive electrode mixture layer includes, for example, a positive electrode active material, an electrically conductive material, and a binder material, and is desirably formed over both surfaces of the positive electrode electricity collector element. The positive electrode 18 can be produced by applying a positive electrode mixture slurry including the positive electrode active material, the electrically conductive material, the binder material, or the like over the positive electrode electricity collector element, drying the applied film, and rolling the dried film, to form the positive electrode mixture layer over both surfaces of the positive electrode electricity collector element. From the viewpoint of higher capacity of the battery, a density of the positive electrode mixture layer is greater than or equal to 3.6 g/cc, and is desirably greater than or equal to 3.6 g/cc and less than or equal to 4.0 g/cc.

As the positive electrode active material, a lithium-metal composite oxide containing metal elements such as Co, Mn, Ni, and Al may be exemplified. As the lithium-metal composite oxide, there may be exemplified $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (wherein M is at least one of Na, Mg, Sc, Y, Mn, Fe, Co, Ni, Cu, Zn, Al, Cr, Pb, Sb, and B, $0.95 \leq x \leq 1.2$, $0.8 < y \leq 0.95$, and $2.0 \leq z \leq 2.3$).

As the electrically conductive material included in the positive electrode mixture layer, there may be exemplified carbon materials such as carbon black, acetylene black, Ketjen black, graphite, carbon nanotube, carbon nanofiber, graphene, or the like. As the binder material included in the positive electrode mixture layer, there may be exemplified a fluororesin such as polytetrafluoroethylene (PTFE), polyvinylidene fluoride (PVdF), polyacrylonitrile (PAN), polyimide, an acrylic resin, polyolefin, carboxy methyl cellulose (CMC) or a salt thereof, styrene-butadiene rubber (SBR), polyacrylic acid (PAA) or a salt thereof, polyvinyl alcohol (PVA), polyethylene oxide (PEO), or the like.

[Negative Electrode]

The negative electrode 20 includes a negative electrode electricity collector element and a negative electrode mixture layer formed over the electricity collector element. For the negative electrode electricity collector element, a foil of a metal which is stable within a potential range of the negative electrode 20 such as copper, a film on a surface layer of which the metal is placed, or the like may be employed. The negative electrode mixture layer includes, for example, a negative electrode active material and a binder material, and is desirably formed over both surfaces of the negative electrode electricity collector element. The negative electrode 20 may be produced by applying a negative electrode mixture slurry including the negative electrode active material, the binder material, or the like over the negative electrode electricity collector element, drying the applied film, and rolling the dried film, to form the negative electrode mixture layer over both surfaces of the negative electrode electricity collector element.

As the negative electrode active material, no particular limitation is imposed so long as the material can reversibly occlude and release lithium ions. For example, carbon materials such as natural graphite, artificial graphite, or the like, a metal which forms an alloy with Li such as silicon (Si), tin (Sn), or the like, an oxide including a metal element such as Si, Sn, or the like, or a lithium-titanium composite oxide, or the like may be employed. When the lithium-titanium composite oxide is employed, an electrically conductive material such as the carbon black is desirably included in the negative electrode mixture layer. For the binder material included in the negative electrode mixture layer, materials similar to those of the positive electrode 18 may be employed.

[Separator]

As exemplified in FIG. 2, the separator 22 includes a porous base member 24, and a filler layer 26 placed over the base member 24. The filler layer 26 includes phosphate particles, and a polyvinylidene fluoride-based resin of a mesh form.

In the separator 22 shown in FIG. 2, the filler layer 26 is placed over both surfaces of the base member 24, but it is sufficient that the filler layer 26 be placed over one of the surfaces of the base member 24. The melting and the polycondensation of the phosphate particles included in the filler layer 26 may be caused not only by the heat when abnormality occurs in the battery, but also by a potential of the positive electrode 18 when the abnormality occurs in the battery. Therefore, from a viewpoint of a quick action of the shutdown function of the separator 22, desirably, the filler layer 26 is placed at least over the surface of the base member 24 opposing the positive electrode 18.

The base member 24 is formed from a porous sheet having an ion permeability and an insulating property such as, for example, a microporous thin film, a woven fabric, a non-woven fabric, or the like. As a resin forming the base member 24, there may be exemplified polyethylene, polypropylene, a polyolefin such as a copolymer of polyethylene and α-olefin, an acrylic resin, polystyrene, polyester, cellulose, or the like. The base member 24 is formed, for example, with polyolefin as a primary constituent, and may be formed substantially with polyolefin alone. The base member 24 may have a single layer structure, or a layered structure. No particular limitation is imposed on a thickness of the base member 24. The thickness is desirably, for example, greater than or equal to 3 µm and less than or equal to 20 µm.

A porosity of the base member 24 is desirably, for example, greater than or equal to 30% and less than or equal to 70%, in order to secure lithium ion permeability. The porosity of the base member 24 is measured by the following method.

(1) Ten locations of the base member are punched out in a circular shape with a diameter of 2 cm, and a thickness h and a mass w of a center part of a small piece of the base member which is punched out are measured.

(2) From the thickness h and the mass w, a volume V and a mass W of the ten small pieces are calculated, and the porosity c is calculated from the following equation.

$$\text{Porosity } \varepsilon(\%) = ((\rho V - W)/(\rho V)) \times 100$$

where ρ is a density of a material of the base member.

An average pore size of the base member 24 is, for example, greater than or equal to 0.02 µm and less than or equal to 0.5 µm, and is desirably greater than or equal to 0.03 µm and less than or equal to 0.3 µm. The average pore size of the base member 24 is measured using a perm-porometer (manufactured by Seika Corporation) which can measure a small pore size by a bubble point method (JIS K3832, ASTM F316-86). The maximum pore size of the base member 24 is, for example, greater than or equal to 0.05 µm and less than or equal to 1 µm, and is desirably greater than or equal to 0.05 µm and less than or equal to 0.5 µm.

Figure 3:
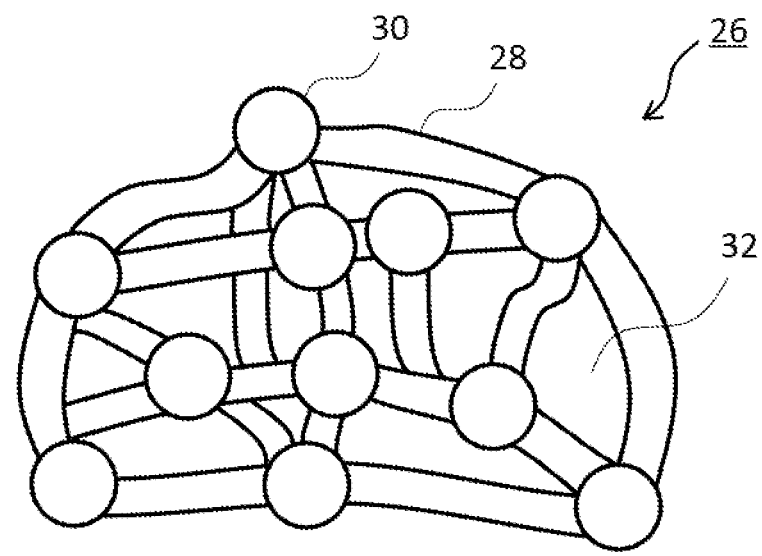
FIG. 3 is a partially enlarged plan view of a filler layer for explaining a state of phosphate particles and polyvinylidene fluoride of a mesh form.

FIG. 3 is a partially enlarged plan view of the filler layer for explaining a state of the phosphate particles and the polyvinylidene fluoride of the mesh form. As shown in FIG. 3, polyvinylidene fluoride-based resins 28 of the filler layer 26 are in a fiber form and are three-dimensionally connected to each other to form a mesh-form network. The fiber form means a state in which a ratio (aspect ratio) of a length (fiber length) to a radius (fiber radius) is 3 or greater. The phosphate particles 30 of the filler layer 26 are fixed by the mesh-form network of the polyvinylidene fluoride-based resin 28. This filler layer 26 has multiple pores 32, and has a structure in which the pores 32 are connected to each other. Because of this, in the filler layer 26, lithium ions can pass through from one surface to the other surface. In addition, the polyvinylidene fluoride-based resin 28 of the mesh form at the surface of the filler layer 26 adheres to the electrode (the positive electrode 18 or the negative electrode 20) by an anchoring effect. During the adhesion of the electrode and the filler layer 26, for example, desirably, press is applied in a layering direction of the electrode element 11 at a normal temperature or at a warm temperature. In the filler layer 26 shown in FIG. 3, a part of the surface of the phosphate particle 30 is covered by the polyvinylidene fluoride-based resin 28, but from the viewpoint of adhesion property with the electrode, desirably, an entirety of the surface of the phosphate particle 30 is covered with the polyvinylidene fluoride-based resin 28.

For the polyvinylidene fluoride-based resin, desirably, there is employed a single polymer of vinylidene fluoride (that is, polyvinylidene fluoride), a copolymer of the vinylidene fluoride and another copolymerizable monomer, or a mixture of these. For the monomer copolymerizable with the vinylidene fluoride, there can be employed one or two or more of tetrafluoroethylene, hexafluoropropylene, trifluoroethylene, vinyl fluoride, or the like. The polyvinylidene fluoride-based resin desirably contains the vinylidene fluoride serving as a constituting unit in greater than or equal to 70 mass %, and more desirably in greater than or equal to 80 mass %, from the viewpoint of adhesion property with the electrode. Further, the polyvinylidene fluoride-based resin desirably contains hexafluoropropylene serving as a constituting unit in greater than or equal to 3 mass % and less than or equal to 15 mass %, from the viewpoint of the adhesion property with the electrode or the like.

It is sufficient that a content of the polyvinylidene fluoride-based resin in the filler layer 26 is greater than or equal to 15 mass % and less than or equal to 40 mass %, but desirably, the content is greater than or equal to 15 mass % and less than or equal to 25 mass %. When the content of the polyvinylidene fluoride-based resin in the filler layer 26 is less than 15 mass %, for example, the adhesion property with the electrode may be reduced, and a battery resistance may be increased. On the other hand, when the content of the polyvinylidene fluoride-based resin in the filler layer 26 exceeds 40 mass %, for example, the porosity of the filler layer 26 may be reduced, resulting in reduced permeability of the lithium ions, and, consequently, increased battery resistance.

As the phosphate particles, there may be exemplified $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, or the like. Of these, from a viewpoint of suppression of a secondary reaction or the like, at least one compound selected from lithium phosphate ($Li_3PO_4$), dilithium hydrogenphosphate ($Li_2HPO_4$), and lithium dihydrogenphosphate ($LiH_2PO_4$) is desirably employed.

It is sufficient that a BET specific surface area of the phosphate particles is greater than or equal to 5 $m^2/g$ and less than or equal to 100 $m^2/g$, but the BET specific surface area is desirably greater than or equal to 20 $m^2/g$ and less than or equal to 80 $m^2/g$. The BET specific surface area is measured according to a BET method (nitrogen adsorption method) of JIS R1626. In general, in consideration of the temperature required for production of a battery, an in-battery temperature during normal usage, and an in-battery temperature during abnormality, the phosphate particles desirably melt at a temperature of about 140° C. to about 190° C. The phosphate particle having the BET specific surface area within the above-described range easily melts at the temperature of about 140° C. to about 190° C. Thus, by using such a particle, the phosphates which melt and for which polycondensation occurs due to heat caused when the abnormality occurs in the battery can quickly fill the pores of the base member 24.

It is sufficient that a volume-based 10% particle size ($D_{10}$) of the phosphate particles is greater than or equal to 0.02 μm and less than or equal to 0.5 μm and is smaller than an average pore size of the base member 24. Desirably, the volume-based 10% particle size is greater than or equal to 0.03 μm and less than or equal to 0.3 μm, and is smaller than the average pore size of the base member 24. When these ranges are satisfied, a portion of the phosphate particles easily penetrates into the pores of the base member 24 at the time of production of the separator 22, or the phosphate particles can quickly fill the pores of the base member 24 when the abnormality occurs in the battery. As a consequence, the increase in the battery temperature when the abnormality occurs in the battery can be effectively suppressed.

Here, the volume-based 10% particle size ($D_{10}$) refers to a particle size in which, in a particle size distribution of the phosphate particles, a volume accumulation value reaches 10%. A 50% particle size ($D_{50}$) and a 90% particle size ($D_{90}$) to be described later refer to particle sizes in which, in the particle size distribution, the volume accumulation value reaches 50% and 90%, respectively. The 50% particle size ($D_{50}$) is also called a median size. The particle size distribution of the phosphate particles is measured by a laser diffraction method (a laser diffraction-scattering granularity distribution measurement apparatus). In the following, unless otherwise noted, the 10% particle size, the 50% particle size, and the 90% particle size refer to the volume-based particle sizes.

The 50% particle size ($D_{50}$) of the phosphate particles is, for example, desirably greater than or equal to 0.05 μm and less than or equal to 1 μm, and is more desirably greater than or equal to 0.1 μm and less than or equal to 1 μm. When the 50% particle size ($D_{50}$) of the phosphate particles is out of these ranges, the advantage of suppression of the increase in the battery temperature when the abnormality occurs in the battery may be reduced in comparison to cases in which the 50% particle size is within these ranges. The 50% particle size ($D_{50}$) of the phosphate particles may be smaller than the average pore size of the base member 24.

The 90% particle size ($D_{90}$) of the phosphate particles is desirably greater than the average pore size of the base member 24. The 90% particle size ($D_{90}$) is, for example, desirably greater than or equal to 0.2 μm and less than or equal to 2 μm, and is more desirably greater than or equal to 0.5 μm and less than or equal to 1.5 μm. When the $D_{90}$ is within these ranges, an amount of phosphate particles penetrating into the pores of the base member 24 at the time of production of the separator 22 can be adjusted in an appropriate range, and the increase in the battery temperature when the abnormality occurs in the battery can be effectively suppressed.

A content of the phosphate particles in the filler layer 26 is desirably greater than or equal to 60 mass % and less than or equal to 85 mass %, and is more desirably greater than or equal to 70 mass % and less than or equal to 80 mass %, from the viewpoint of securing a sufficient amount for filling the pores of the base member 24.

In the separator 22, a portion of the phosphate particles of the filler layer 26 penetrates into the pores of the base member 24, and an average value of a penetration depth of the particles is desirably greater than or equal to 0.02 μm and less than or equal to 2 μm, and is more desirably greater than or equal to 0.1 μm and less than or equal to 1.5 μm.

Here, the penetration depth of the phosphate particles refers to a length, along a thickness direction of the base member 24, from the surface of the base member 24 to an end of the particles which have penetrated into the base member 24. The penetration depth can be measured by a cross sectional observation of the base member 24 using a scanning electron microscope (SEM) or a transmission electron microscope (TEM).

The phosphate particles desirably penetrate into the pores over an approximately entire region of the surface of the base member 24. That is, the phosphate particles which have penetrated into the pores exist approximately uniformly over the surface of the base member 24. In addition, the penetration depth of the phosphate particles is desirably approximately uniform over an approximately entire region of the surface of the base member 24.

An average value of the penetration depth of the phosphate particles is, for example, greater than or equal to 1% and less than or equal to 50% with respect to the thickness of the base member 24, and is desirably greater than or equal to 5% and less than or equal to 30%. By adjusting the 10% particle size ($D_{10}$) of the phosphate particles or the like according to the average pore size of the base member 24, it becomes possible to control the depth of the phosphate particles penetrating into the base member 24.

When the filler layer 26 is provided over both surfaces of the base member 24, a total thickness of the filler layer 26 (thickness other than the penetration depth of the phosphate particles) is desirably, for example, less than or equal to 6 μm, is more desirably greater than or equal to 1 μm and less than or equal to 6 μm, and is particularly desirably greater than or equal to 1 μm and less than or equal to 4 μm. A thickness of one filler layer 26 is, for example, desirably less than or equal to 4 μm, and is more desirably greater than or equal to 0.5 μm and less than or equal to 2 μm.

A porosity of the filler layer 26 is desirably greater than or equal to 30% and less than or equal to 70%, from the viewpoints of securing a superior ion permeability during charging or discharging of the battery, of securing a physical strength, and the like. The porosity of the filler layer 26 is calculated by the following equation.

$$\text{Porosity of filler layer}(\%) = 100 - [[W \div (d \times \rho)] \times 100]$$

where W is a mass per unit area of the filler layer (g/cm²), d is a thickness of the filler layer (cm), and ρ is an average density of the filler layer (g/cm³).

The filler layer 26 may further include heteropoly acid. It can be deduced that, by adding the heteropoly acid, polycondensation of the melted phosphates may be promoted. As the heteropoly acid, there may be exemplified phosphomolybdic acid, phosphotungstic acid, phosphomolybdotungstic acid, phosphomolybdovanadic acid, phosphomolybdotungstovanadic acid, phosphotungstovanadic acid, tungstosilisic acid, molybdosilisic acid, molybdotungstosilisic acid, and molybdotungstovanadosilisic acid.

The filler layer 26 may include, for example, inorganic particles having a high melting point (thermal endurance). The inorganic particle is desirably formed from, for example, an inorganic compound of insulating characteristic, which does not melt or decompose during the abnormal heat generation of the battery. Examples of the inorganic particle include metal oxides, metal oxide hydrates, metal hydroxides, metal nitrides, metal carbides, metal sulfides, or the like. The Dso of the inorganic particles is, for example, greater than or equal to 0.2 μm and less than or equal to 2 μm.

Examples of the metal oxides and the metal oxide hydrates include aluminum oxide (alumina), boehmite ($Al_2O_3H_2O$ or AlOOH), magnesium oxide, titanium oxide, zirconium oxide, silicon oxide, yttrium oxide, zinc oxide, or the like. Examples of the metal nitrides include silicon nitride, aluminum nitride, boron nitride, titanium nitride, or the like. Examples of the metal carbides include silicon carbide, boron carbide, or the like. Examples of the metal sulfides include barium sulfate or the like. Examples of the metal hydroxides include aluminum hydroxide or the like. For a melting point of substances such as boehmite, for example, which melt after being altered to alumina, desirably, the melting point of the substance after the alteration is higher than the melting point of the phosphate particle.

Alternatively, the inorganic particle may be porous aluminosilicate such as zeolite ($M_{2/n}O \cdot Al_2O_3 \cdot xSiO_2 \cdot yH_2O$, wherein M is a metal element, $x \geq 2$, and $y \geq 0$), a laminar silicate such as talc ($Mg_3Si_4O_{10})(OH)_2$), barium titanate ($BaTiO_3$), strontium titanate ($SrTiO_3$), or the like. In particular, from the viewpoints of the insulating characteristic, the thermal endurance, and the like, desirably, at least one compound selected from aluminum oxide, boehmite, talc, titanium oxide, and magnesium oxide is desirably employed.

An example method of producing the filler layer 26 will now be described. A slurry including, for example, the phosphate particle, the polyvinylidene fluoride-based resin, and a dispersion medium is applied over the surface of the base member 24, the resulting structure is passed through a non-solvent or a mixture solvent of the non-solvent and the dispersion medium to extract the dispersion medium (phase separation), and then a phase separation method may be applied to dry the resulting structure, to form the filler layer 26 including the phosphate particles and the polyvinylidene fluoride-based resin of the mesh form. The slurry may be applied by any conventionally known method such as gravure printing or the like.

The non-solvent is a solvent in which almost no polyvinylidene fluoride-based resin dissolves, and there may be exemplified, for example, water, alcohols, ethers, or the like. The dispersion medium is a solvent in which the polyvinylidene fluoride-based resin dissolves, and there may be exemplified, for example, N-methyl-2-pyrrolidone, N,N-dimethylformamide, N,N-dimethylacetamide or the like. When water is used as the non-solvent, desirably, N,N-dimethylacetamide is used, from the viewpoint of quickness of an extraction rate of the dispersion medium.

The penetration depth of the phosphate particles into the pores of the base member 24 can be controlled through the particle size of the phosphate particles, a drying condition of the applied film of the slurry, a method of application of the slurry, or the like. For example, when the 10% particle size ($D_{10}$) of the phosphate particles is reduced or when the drying condition of the applied film is set milder, it becomes easier for the phosphate particles to penetrate into the base member 24. In addition, when a rotational speed of a gravure roll used for the application of the slurry is decreased, it becomes easier for the phosphate particles to penetrate into the base member 24.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution), and may alternatively be a solid electrolyte using a gel-form polymer or the like. For the non-aqueous solvent, for example, esters, ethers, nitriles such as acetonitrile, amides such as dimethylformamide, or a mixture solvent of two or more of these solvents may be employed. The non-aqueous solvent may include a halogen substitution product in which at least a part of hydrogens of the solvent described above is substituted with a halogen atom such as fluorine.

Examples of the esters include cyclic carbonic acid esters such as ethylene carbonate (EC), propylene carbonate (PC), and butylene carbonate, chain carbonic acid esters such as dimethyl carbonate (DMC), ethylmethyl carbonate (EMC), diethyl carbonate (DEC), methylpropyl carbonate, ethylpropyl carbonate, and methylisopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl furan, 1,8-cineol, and crown ether, and chain ethers such as 1,2-dimethoxy ethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxy ethane, 1,2-dibutoxy ethane, diethylene glycol dimethyl ether, diethylene glycol diethyl ether, diethylene glycol dibutyl ether, 1,1-dimethoxy methane, 1,1-diethoxy ethane, triethylene glycol dimethyl ether, and tetraethylene glycol dimethyl ether.

As the halogen substitution product, desirably, fluorinated cyclic carbonic acid esters such as fluoroethylene carbonate (FEC), fluorinated chain carbonic acid ester, or fluorinated chain carboxylate esters such as fluoromethyl propionate (FMP) is employed.

The electrolyte salt is desirably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (wherein $1<x<6$, n is 1 or 2), $LiB_{10}Cl_{10}$, LiCl, LiBr, LiI, lithium chloroborane, lithium lower aliphatic carboxylate, borate salts such as $Li_2B_4O_7$ and $Li(B(C_2O_4)F_2)$, and imide salts such as $LiN(SO_2CF_3)_2$, and $LiN(C_lF_{2l+1}SO_2)(C_mF_{2m+1}SO_2)$ (wherein each of l and m is an integer greater than or equal to 0). As the lithium salt, these materials may be used as a single material or a mixture of a plurality of these materials may be used. Of these, $LiPF_6$ is desirably used, from the viewpoints of ion conductivity, electrochemical stability, or the like. A concentration of the lithium salt is desirably set to 0.8~1.8 mol per 1 L of the non-aqueous solvent.

EXAMPLES

The present disclosure will now be further described with reference to Examples.

The present disclosure, however, is not limited to these Examples.

Example 1

[Production of Separator]

A separator having a three-layer structure of a filler layer/a porous base member made of polyethylene/a filler layer was produced through the following process.

(1) Preparation of Slurry

Lithium phosphate particles ($Li_3PO_4$) having a BET specific surface area of 61.3 m²/g, a $D_{10}$ of 0.091 μm, and a $D_{50}$ of 0.17 μm, and a polyvinylidene fluoride-based resin (including 5 mass % of hexafluoropropylene) were mixed with a mass ratio of 6:4, and N,N-dimethylacetamide was added, to prepare a slurry.

(2) Formation of Filler Layer

Over one surface of a polyethylene porous base member of a single layer with a thickness of 12 μm, the above-described slurry was applied, the resulting structure was passed through water, water is removed by air-blow, and then, the structure was dried at 60° C. for 6 minutes, to form the filler layer over the one surface of the base member. Through a similar operation, the filler layer was formed also over the other surface of the base member. An average pore size of the polyethylene porous base member was 0.50 μm.

[Production of Positive Electrode]

As the positive electrode active material, a lithium-composite oxide particle was used which is represented by $Li_{1.05}Ni_{0.82}Co_{0.15}Al_{0.03}O_2$. The positive electrode active material, carbon black, and PVdF were mixed in NMP with a mass ratio of 100:1:1, to prepare a positive electrode mixture slurry. Then, the positive electrode mixture slurry was applied over both surfaces of a positive electrode electricity collector element formed from an aluminum foil, the applied film was dried and rolled by a rolling roller, and an aluminum electricity collector tab was attached, to produce a positive electrode in which the positive electrode mixture layer was formed over both surfaces of the positive electrode electricity collector element. A filling density of the positive electrode mixture was 3.70 g/cm³.

[Production of Negative Electrode]

Artificial graphite, sodium carboxymethyl cellulose (CMC-Na), and a dispersion of styrene-butadiene rubber (SBR) were mixed in water with a solid content mass ratio of 98:1:1, to prepare a negative electrode mixture slurry. Then, the negative electrode mixture slurry was applied over both surfaces of a negative electrode electricity collector element formed from a copper foil, the applied film was dried and rolled with a rolling roller, and a nickel electricity collector tab was attached, to form a negative electrode in which a negative electrode mixture layer was formed over both surfaces of the negative electrode electricity collector element. A filling density of the negative electrode mixture was 1.70 g/cm³.

[Preparation of Non-Aqueous Electrolyte]

To a mixture solvent in which ethylene carbonate (EC), ethylmethyl carbonate (EMC), and dimethyl carbonate (DMC) were mixed with a volume ratio of 3:3:4, lithium hexafluorophosphate ($LiPF_6$) was dissolved in a concentration of 1 mol/liter. Further, vinylene carbonate (VC) was dissolved in the mixture solvent in a concentration of 1 mass %, to prepare a non-aqueous electrolyte.

[Production of Non-Aqueous Electrolyte Secondary Battery]

The negative electrode and the positive electrode were alternately layered with the separator therebetween, to produce a layered-type electrode element. The electrode element was pressed in the layering direction, and was housed in a rectangular battery casing along with the non-aqueous electrolyte, to produce a rectangular test cell of 750 mAh.

Example 2

Anon-aqueous electrolyte secondary battery was produced in a manner similar to Example 1 except that, in the preparation of the slurry, lithium phosphate particles ($Li_3PO_4$) were used having the BET specific surface area of 6.5 m²/g, the $D_{10}$ of 0.42 μm, and the $D_{50}$ of 0.7 μm.

Example 3

A non-aqueous electrolyte secondary battery was produced in a manner similar to Example 1 except that, in the preparation of the slurry, the lithium phosphate particles ($Li_3PO_4$) and the polyvinylidene fluoride-based resin were mixed with a mass ratio of 7:3.

Example 4

A non-aqueous electrolyte secondary battery was produced in a manner similar to Example 1 except that, in the preparation of the slurry, the lithium phosphate particles ($Li_3PO_4$) and the polyvinylidene fluoride-based resin were mixed with a mass ratio of 8:2.

Comparative Example 1

A non-aqueous electrolyte secondary battery was produced in a manner similar to Example 1 except that, in the preparation of the slurry, lithium phosphate particles ($Li_3PO_4$) were used having the BET specific surface area of 3.3 m²/g, the $D_{10}$ of 0.68 μm, and the $D_{50}$ of 1.15 μm.

Comparative Example 2

Anon-aqueous electrolyte secondary battery was produced in a manner similar to Example 1 except that, in the formation of the filler layer, after the slurry was applied over the polyethylene porous base member, the resulting structure was immediately dried at 60° C. for 6 minutes without being passed through the water.

Comparative Example 3

Anon-aqueous electrolyte secondary battery was produced in a manner similar to Example 1 except that, in the preparation of the slurry, the lithium phosphate particles ($Li_3PO_4$) and the polyvinylidene fluoride-based resin were mixed with a mass ratio of 9:1.

[Measurement of Battery Resistance]

The batteries of Examples and Comparative Examples were charged under an environment of 25° C. with a constant current of 225 mA until the battery voltage reached 3.7V, and then, were charged with a constant voltage at 3.7V for 30 minutes. An OCV in this case was set as V1(V). Then, the batteries were discharged with a constant current of 225 mA for 10 seconds, and a voltage after the 10 seconds was set as V2(V). The battery resistance was calculated from the following formula. TABLE 1 shows results of the calculation.

$$\text{Battery resistance}(\Omega)=(V1-V2)/0.225$$

[Nail Penetration Test]

The batteries of Examples and Comparative Examples were charged under an environment of 25° C. with a constant current of 225 mA until the battery voltage reached 4.2V, and then, were charged at a constant voltage of 4.2V until the current value became 37.5 mA. Under an environment of 25° C., a wire nail having a size of 1 mmφ was penetrated in the layering direction of the electrode element at a rate of 0.1 mm/second through a center part of a side surface of the battery in the above-described charge state, and the nail penetration was stopped when the nail completely penetrated through the battery. A battery temperature at a location 5 mm distanced from the side surface portion of the battery through which the wire nail was penetrated was measured, and a maximum reaching temperature was determined. TABLE 1 shows the results.

TABLE 1

| | SEPARATOR | | | | BATTERY PROPERTY | |
|---|---|---|---|---|---|---|
| | MASS RATIO OF PHOSPHATE PARTICLES/ POLYVINYLIDENE FLUORIDE | PARTICLE SIZE $D_{10}$ OF PHOSPHATE PARTICLES (μm) | PARTICLE SIZE $D_{50}$ OF PHOSPHATE PARTICLES (μm) | BET OF PHOSPHATE PARTICLES ($m^2/g$) | BATTERY RESISTANCE (mΩ) | MAXIMUM REACHING TEMPERATURE (° C.) |
| EXAMPLE 1 | 6/4 | 0.091 | 0.17 | 61.3 | 151 | 459 |
| EXAMPLE 2 | 6/4 | 0.42 | 0.7 | 6.5 | 155 | 462 |
| EXAMPLE 3 | 7/3 | 0.091 | 0.17 | 61.3 | 158 | 454 |
| EXAMPLE 4 | 8/2 | 0.091 | 0.17 | 61.3 | 159 | 450 |
| COMPARATIVE EXAMPLE 1 | 6/4 | 0.68 | 1.15 | 3.3 | 159 | 482 |
| COMPARATIVE EXAMPLE 2 | 6/4 | 0.091 | 0.17 | 61.3 | 660 | 460 |
| COMPARATIVE EXAMPLE 3 | 9/1 | 0.091 | 0.17 | 61.3 | 164 | 445 |

The polyvinylidene fluoride-based resin in the filler layers of Examples 1 to 4 and Comparative Examples 1 and 3 had a mesh-form structure. On the other hand, the polyvinylidene fluoride-based resin of the filler layer of Comparative Example 2 was adhered as a solid content of a small lump form on the surface of the phosphate particle, and did not have the mesh-form structure. The non-aqueous electrolyte secondary batteries of Examples 1 to 4 having the polyvinylidene fluoride-based resin of the filler layer in the mesh form showed lower battery resistances as compared to the non-aqueous electrolyte secondary battery of Comparative Example 2 in which the polyvinylidene fluoride-based resin of the filler layer was the solid content of a small lump form. While the filler layers of Examples 1 to 4 had an adhesion property with the electrode, the filler layers of Comparative Examples 2 and 3 did not have the adhesion property with the electrode. In addition, Examples 1 to 4 had lower battery resistances than Comparative Example 3, and had lower maximum reaching temperature than Comparative Example 1 in the nail penetration test (that is, the increase in the battery temperature when the abnormality occurs in the battery was suppressed).

REFERENCE SIGNS LIST

10 NON-AQUEOUS ELECTROLYTE SECONDARY BATTERY; 11 ELECTRODE ELEMENT; 12 POSITIVE ELECTRODE TERMINAL: 13 NEGATIVE ELECTRODE TERMINAL; 14 BATTERY CASING; 15 CASING BODY; 16 SEALING ELEMENT; 17 INSULATING MEMBER; 18 POSITIVE ELECTRODE; 20 NEGATIVE ELECTRODE; 22 SEPARATOR; 24 BASE MEMBER; 26 FILLER LAYER; 28 POLYVINYLIDENE FLUORIDE-BASED RESIN; 30 PHOSPHATE PARTICLE; 32 PORE.

The invention claimed is:

1. A non-aqueous electrolyte secondary battery comprising:
   an electrode element having a positive electrode, a negative electrode, and a separator, and in which the positive electrode and the negative electrode are alternately layered with the separator therebetween; and
   a non-aqueous electrolyte, wherein
   the separator comprises a porous base member, and a filler layer placed over the base member,
   the filler layer includes phosphate particles and a polyvinylidene fluoride-based resin of a mesh form,
   a content of the polyvinylidene fluoride-based resin in the filler layer is greater than or equal to 15 mass % and less than or equal to 40 mass %,
   a volume-based 10% particle size ($D_{10}$) of the phosphate particles is greater than or equal to 0.02 μm and less than or equal to 0.5 μm, and is smaller than an average pore size of the base member, and
   a BET specific surface area of the phosphate particles is greater than or equal to 5 $m^2/g$ and less than or equal to 100 $m^2/g$.

2. The non-aqueous electrolyte secondary battery according to claim 1, wherein
   a portion of the phosphate particles penetrates into a pore of the base member, and
   an average value of a penetration depth of the particles is greater than or equal to 0.02 μm and less than or equal to 2 μm.

3. The non-aqueous electrolyte secondary battery according to claim 1, wherein a thickness of the filler layer is less than or equal to 4 μm.

4. The non-aqueous electrolyte secondary battery according to claim 1, wherein an entirety of a surface of the phosphate particle is covered with the polyvinylidene fluoride-based resin.

5. The non-aqueous electrolyte secondary battery according to claim 1, wherein a content of the polyvinylidene fluoride-based resin in the filler layer is greater than or equal to 15 mass % and less than or equal to 25 mass %.

6. The non-aqueous electrolyte secondary battery according to claim 1, wherein the polyvinylidene fluoride-based resin includes hexafluoropropylene in an amount of greater than or equal to 3 mass % and less than or equal to 15 mass %.

* * * * *